Figure 1:
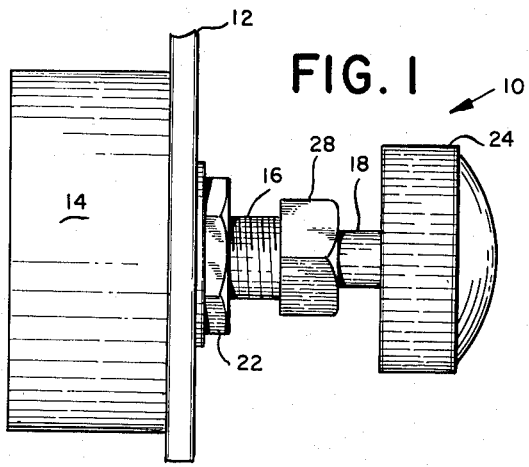

May 17, 1966 W. W. GARSTANG ETAL 3,251,616

SHAFT LOCKING DEVICE

Filed May 6, 1963 2 Sheets-Sheet 1

INVENTOR.
William W. Garstang &
Kenneth L. Roy
BY

Attorney

May 17, 1966 W. W. GARSTANG ETAL 3,251,616
SHAFT LOCKING DEVICE
Filed May 6, 1963 2 Sheets-Sheet 2

INVENTORS
William W. Garstang &
Kenneth L. Roy
BY
Gerrit D. Foster
Attorney

United States Patent Office 3,251,616
Patented May 17, 1966

1

3,251,616
SHAFT LOCKING DEVICE
William W. Garstang, Milwaukee, and Kenneth L. Roy, Grafton, Wis., assignors to Globe-Union Inc., Milwaukee, Wis., a corporation of Delaware
Filed May 6, 1963, Ser. No. 278,367
4 Claims. (Cl. 287—52.06)

This application is a continuation-in-part of a copending U.S. Patent application of William W. Garstang and Kenneth L. Roy, entitled "Shaft Locking Device," Serial No. 182,872, filed March 27, 1962 (and now abandoned), and assigned to the assignee of this application.

This invention relates to control shafts and, more particularly to such a shaft mounted in a bushing and having in combination therewith means for selectively locking the shaft against rotation.

Control devices such as potentiometers, switches, variable capacitors and resistors, etc., which are actuated through a rotatable shaft, are often used where they are subjected to shock and/or vibrational forces as well as where they are essentially free of such external forces. Heretofore, the practice has been to furnish such control devices in two different versions. One, for use in applications where the shaft was not to be subjected to shock and/or vibration, included what is known in the art as a standard bushing and the other included a specially designed bushing which would, in combination with a special nut, lock the shaft and prevent movement under the influence of shock and/or vibrational forces. Bushings known in the art as standard type bushings are generally cylindrical, externally threaded members free of axially extending slots or other equivalent means provided to weaken the bushing to allow it to collapse onto and lock the shaft.

Since the above control devices are assembled at the factory, it is apparent that each device was of necessity made available in two versions, one for applications where the shaft was to be selectively locked against rotation and the other for applications where it was not necessary to lock the shaft against rotation, thereby resulting in an increased inventory.

An object of this invention is to provide means whereby only one version of a control device need be provided, that one version being usable in either of the two applications discussed above.

A more specific object of this invention is to provide means usable in combination with a standard bushing and effective to selectively lock the shaft against rotation; and means which will lock without any rotation of the shaft or other movement which would disturb a preselected adjustment.

Another more specific object of this invention is to hold captive, within a removable cap or nut, means for selectively locking a control shaft against rotation or other movement.

For the achievement of these and other objects this invention contemplates the combination with a standard bushing and a rotatable control shaft mounted within that bushing of means including a member normally loosely engageable with the shaft and selectively movable into locking engagement with the shaft to hold the shaft against rotation.

The novel features of this invention are set forth in

Figure 3:
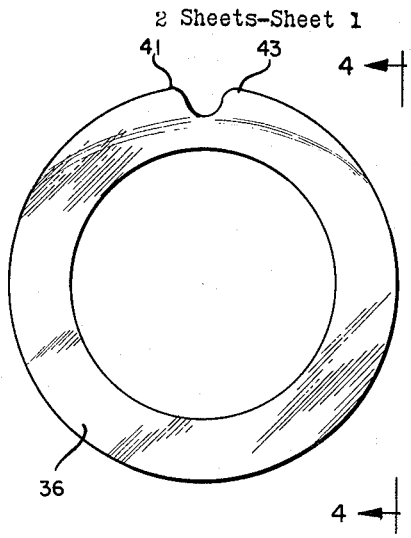
Figure 2:
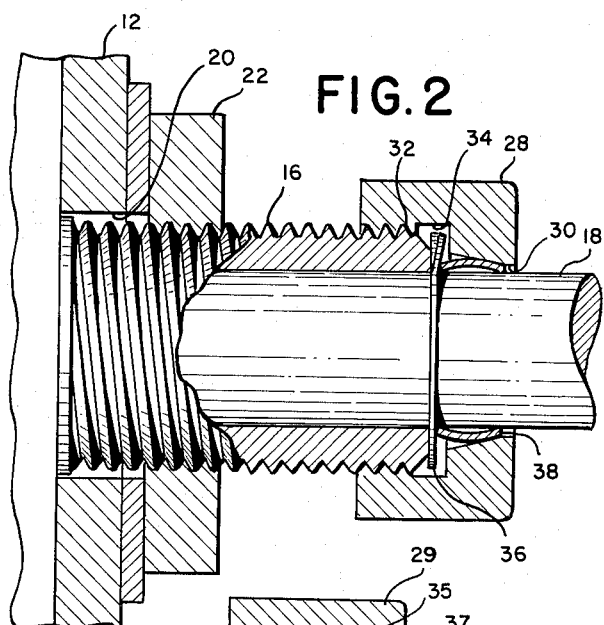
Figure 4:
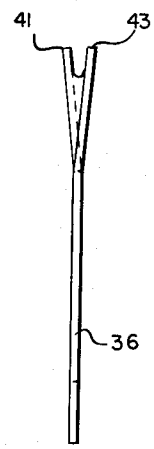
Figure 5:
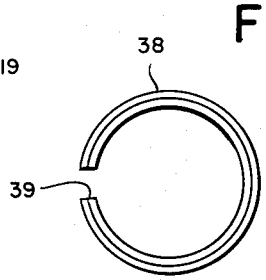

2 the appended claims. The invention itself, together with additional objects and advantages thereof, will be more clearly understood from a reading of the following description in connection with the accompanying drawings wherein several embodiments of the invention are illustrated and in which:

FIG. 1 is a side elevation of a preferred embodiment;
FIG. 2 is an axial enlarged section view of a portion of the embodiment of FIG. 1;
FIG. 3 is a plan view of the retaining washer;
FIG. 4 is an end view of the retaining washer;
FIG. 5 is a view of the locking ring; and
FIGS. 6–10 illustrate alternative embodiments.

With particular reference to FIGS. 1 and 2, a control device 10 is illustrated as connected to a suitable mounting surface 12. As desired, a switch, capacitor, variable resistor or other adjustable control device can be included in housing 14. A bushing 16 and a shaft 18, rotatably mounted within the bushing, extend through an aperture 20 in mounting surface 12. A mounting nut 22 is threaded on bushing 16 and connects the assembly 10 to mounting surface 12. The right end of shaft 18 is provided with a control knob 24 or rotating shaft 18 and, through that rotation, actuating the control device contained in housing 14.

Bushing 16 is a standard bushing as described above, however, it should be noted that this invention is not limited to any particular bushing design. Bushing 16 is externally threaded to receive mounting nut 22 and also receives a nut or cap 28 having a central opening or bore 30 through which shaft 18 extends. Opening or bore 30 at one end is specially formed with a tapered section increasing in diameter from right to left, as viewed in FIG. 2, thus forming a generally conical or wedge shaped pressure surface for a clamping ring hereinafter described.

Inner threads 32 of nut 28 terminate in spaced relationship from the inner wall of the nut to provide an annular recess or enlarged notch area 34. A retaining washer 36 is positioned in area 34 and a locking ring 38 is engaged between the retaining washer 36 and the wedge shaped opening 30 of the nut 28. In transverse cross section, locking ring 38 is bowed outwardly with respect to the shaft and is split to provide an opening 39 therein. As will be more particularly described hereinafter, the bowed configuration permits ring 38 to collapse and lock the shaft against rotation. Retaining washer 36 has a diameter such that when positioned in notch 34 it will be held captive therein by threads 32. Formed tabs 41 and 43 are provided on the retaining washer and extend on opposite sides of the plane of washer to provide means whereby the washer during assembly can be threaded via threads 32 of nut 28 into position within notch 34 where it is journaled on shaft 18. Thus, in assembly locking ring 38 is placed in nut 28 and retaining washer 36 is threaded into position in the notch. When positioned in notch 34, the right-hand end of threads 32, as viewed in FIG. 2, prevent accidental removal of the washer and locking ring 38 is held captive in nut 28 by the retaining washer to thereby provide a completely integrated assembly. With this assembly, shaft 18 can be selectively locked against rotation by screwing nut 28 onto bushing 16. As nut 28 advances on the bushing, retaining washer 36 engages the end of bushing 16 and locking ring 38 is engaged between the washer and the tapered section of the bore or opening 30 which, being wedge-shaped, causes the lock ring to deform inwardly, i.e. in a radial direction with respect to the shaft. The locking ring is wedged between the retaining washer and nut 28 and its ends securely grip shaft 18 to lock it against rotation. Preferably, ring 38 fits loosely on the shaft and does not interfere with shaft rotation other than when in its locked position.

Figure 6:
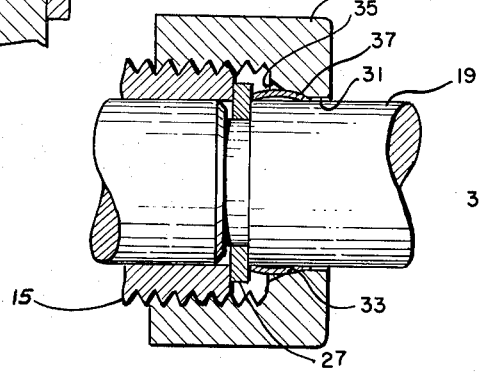

An alternative embodiment is illustrated in FIG. 6 and illustrates that a locking ring and nut can be used, if desired, without a retaining washer. Such an arrangement, although not as advantageous as that described in connection with FIGS. 1–5 in that the lock ring is not held captive therein, may be satisfactory for some applications. With particular reference to FIG. 6, locking ring 37 is positioned on shaft 19 and is engaged between nut 29 and a C-ring 27. An opening 31 in nut 29 includes a central portion 33 having a generally arcuate configuration for closely receiving and evenly distributing forces to ring 37 as nut 29 is advanced into the bushing. Opening 31 also includes an end portion 35 flaring upwardly and outwardly from portion 33 to initiate engagement between ring 37 and surface 33. Therefore, as nut 29 is threaded onto bushing 15, ring 37 is engaged in opening 31 and is deformed inwardly to engage and lock shaft 19 against rotation. The C-ring 27 is used in the assembly of some control devices and it should be understood that, if desired and with some modifications of the control structure, the C-ring can be eliminated and ring 33 directly engage the bushing.

Figure 7:
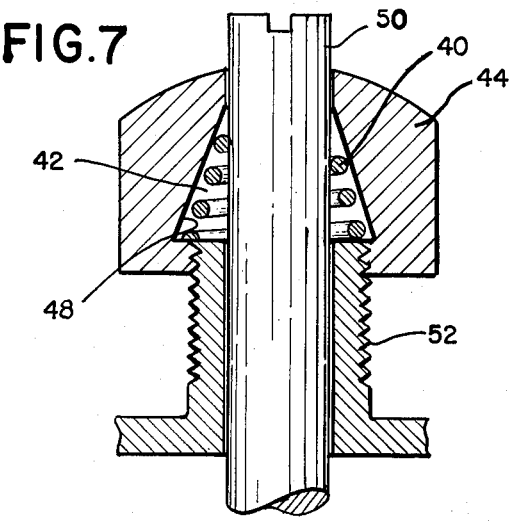

The alternative embodiments illustrated in FIGS. 7–10 will now be described and it will be noted that similar to that of FIG. 6, only a portion of the control device has been illustrated in each instance. In FIG. 7 a coil spring 40 is supported in opening 42 in nut 44. Opening 42 includes a face 48 extending inwardly and upwardly toward shaft 50. Spring 40 engages the end of bushing 52 so that as nut 44 is threaded onto the bushing the spring is compressed and wedged against the shaft locking it in any preselected position. It will also be noted that spring 40 will be held captive in nut 44 when the nut is removed from the bushing. If desired spring 40 could be replaced by a solid resilient member deformable into engagement with the shaft upon tightening movement of the nut and bushing.

Figure 8:
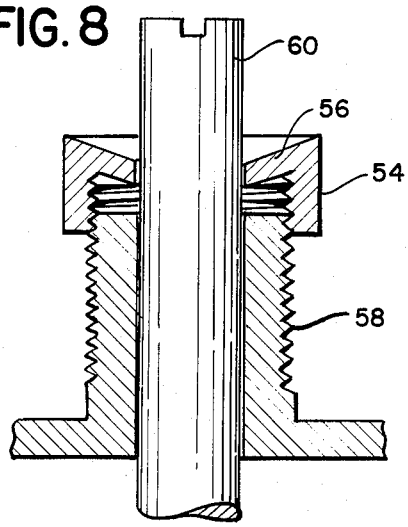
Figure 9:
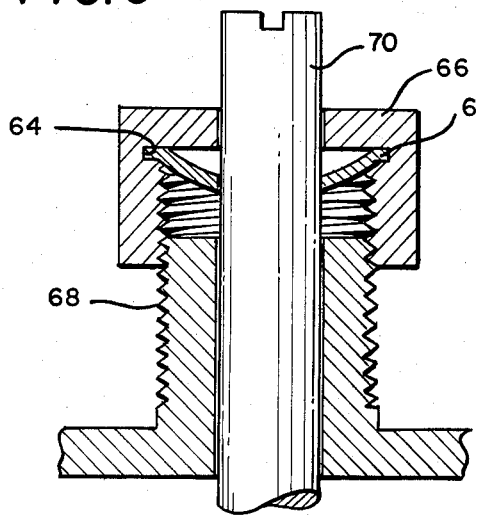
Figure 10:
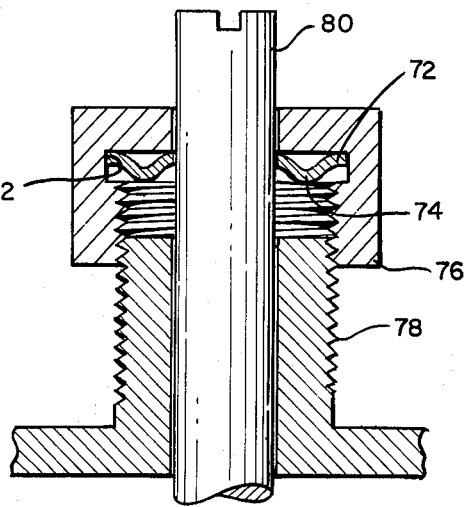

In FIG. 8, nut 54 includes an integral upper end 56 which, as nut 54 is threaded onto bushing 58, is deformed and wedged against shaft 60 to lock it in place. Here the upper end of bushing 58 acts as a stop to prevent end 56 from moving axially toward the bushing with nut 54 and causing end 56 to deform and engage the shaft for locking. In FIG. 9 a deformable lock washer 62 is snapped into a groove 64 in nut 66 and as the nut is threaded onto bushing 68 the lock washer engages the bushing and is wedged into engagement with shaft 70. Lock washer 62 is held captive in groove 64 of nut 66. Similarly in FIG. 10, a washer 72 is provided with a bowed portion 74. As nut 76 is threaded onto bushing 78, washer 72 engages the bushing and bowed portion 74 collapses, wedging washer 72 against shaft 80. Here also, washer 72 snaps into a groove 82 in the nut and is held captive therein.

In accordance with this invention only one version of the various control devices need be furnished as the above described locking device can be used with a standard type of bushing and provide for selective locking of the shaft against rotation. Hence, a substantial reduction in inventory is achieved. Furthermore, it will be noted that in the embodiments of FIGS. 1–5 and of FIGS. 7–10 the member which engages and locks onto the shaft is held captive in the nut or cap thereby avoiding loose and easily lost parts.

It should be understood that this invention is not necessarily limited to use in locking a rotatable shaft but could have other applications, e.g. to lock an axially slideable adjusting rod against movement. Accordingly, it is understood that many variations and additional embodiments of this invention are possible without departing from the scope of this invention and for that reason the description and illustration of this invention in connection with particular embodiments thereof has been intended for illustrative purposes only and should not be taken by way of limitation. Accordingly, it is intended in the appended claims to cover all modifications and embodiments of this invention as fall within the true spirit and scope thereof.

What we claim is:

1. In a clamping fitting, a nut member provided with a bore extending therethrough, the wall of said bore intermediate its ends being provided with an annular recess, the wall of said bore between said recess and one end of said nut being provided with screw threads opening into said annular recess and having a root diameter less than the diameter of said recess, the wall of said bore between said recess and the opposite end of said nut member being tapered inwardly and axially towards said opposite end to provide a generally conical pressure surface within said nut member, a split resilient clamping member disposed within the tapered portion of the bore and movable axially within the nut, said clamping member having an axially curved exterior surface dimensioned to abut said conical pressure surface which thus limits axial movement of said clamping member in one direction, means for retaining said clamping member within said nut member comprising a generally circular disc provided on its periphery with screw thread engaging features, said disc being dimensioned for operative screw threaded engagement with the threads within said bore, whereby it may be moved axially of the bore along said threads and into said annular recess, said retainer member having an effective outer diameter less than the root diameter of the threads of the nut but greater than the crest diameter of said threads, said retaining member having a central aperture having a diameter less than the exterior diameter of the clamping member and thereby forming an axial abutment limiting movement of the clamping member in the opposite direction, thus rendering the clamping member captive within said nut.

2. The clamping fitting as described in claim 1 wherein the annular recess includes side walls axially spaced apart a distance greater than the axial dimension of said retainer member but less than the axial extent of said clamping member to provide a limited axial movement of the retainer member within the nut.

3. The clamping fitting as described in claim 1 wherein the retainer member is in the form of a generally circular planar disc having a radial notch in its outer periphery thereby providing circumferentially spaced portions on opposite sides of the notch, said portions being flared axially in opposite directions out of the plane of the disc a distance apart substantially equal to the pitch of the screw threads within the nut.

4. The clamping fitting as described in claim 1 wherein said retainer member and said clamping member are centrally apertured to receive a shaft, and said nut is screw threaded upon the threaded end of a bushing in which a shaft is journalled, whereby when the nut is threadedly advanced on said bushing to a point where the retainer member is moved into abutting engagement with the threaded end of the bushing, continued advance movement of the nut on said bushing imposes pressure on said clamping member through said pressure surface to deform the same into clamping engagement with the shaft.

References Cited by the Examiner

UNITED STATES PATENTS

| | | | |
|---|---|---|---|
| 1,557,923 | 10/1925 | Carroll | 287—114 |
| 1,683,350 | 9/1928 | Hein | 285—322 |
| 2,064,140 | 12/1936 | Appleton | 385—340 |

(Other references on following page)

UNITED STATES PATENTS

| | | | |
|---|---|---|---|
| 2,247,032 | 6/1941 | Norton | 285—321 |
| 2,287,889 | 6/1942 | Krumsiek et al. | 285—342 |
| 2,341,970 | 2/1944 | Worel | 24—124 |
| 2,460,621 | 2/1949 | Courtot | 285—343 |
| 2,737,403 | 3/1956 | Ellis | 285—342 |
| 2,798,748 | 7/1957 | Maurer | 287—52.04 X |
| 2,869,883 | 1/1959 | Dunbar | 287—126 X |
| 2,890,266 | 6/1959 | Bollmeier | 287—76 |
| 2,989,327 | 6/1961 | Hermanus | 287—52 |
| 3,007,726 | 11/1961 | Parkin | 85—36 X |
| 3,025,931 | 3/1962 | Jones | 188—67 X |
| 3,056,617 | 10/1962 | Snoddy | 285—379 X |
| 3,135,033 | 6/1964 | Jackson | 287—114 |

FOREIGN PATENTS

| | | |
|---|---|---|
| 91,452 | 2/1923 | Austria. |
| 782,823 | 6/1935 | France. |
| 28,102 | 12/1908 | Great Britain. |
| 585,105 | 1/1947 | Great Britain. |

CARL W. TOMLIN, *Primary Examiner.*